US007277735B1

(12) United States Patent
Oh et al.

(10) Patent No.: US 7,277,735 B1
(45) Date of Patent: Oct. 2, 2007

(54) METHOD AND SYSTEM FOR INVOKING SIMULTANEOUS RINGING

(75) Inventors: Dae-Sik Oh, Overland Park, KS (US); Mark L. Yarkosky, Overland Park, KS (US); David L. Morris, Overland Park, KS (US); Vicki L. Walton, Lone Jack, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 64 days.

(21) Appl. No.: 10/829,740

(22) Filed: Apr. 22, 2004

(51) Int. Cl.
*H04Q 7/20* (2006.01)
*H04M 1/00* (2006.01)
*H04B 1/38* (2006.01)

(52) U.S. Cl. ............... 455/567; 455/461; 455/425; 455/550.1; 455/556.2; 455/422.1; 455/561; 455/426.2

(58) Field of Classification Search ............ 455/414.1, 455/414.3, 416–417, 456.1–456.6, 518–520, 455/453.3, 414.2, 41.2, 74, 404.2, 422.1, 455/425, 500, 426.1, 426.2, 432.3, 517, 526, 455/550.1, 554.2, 553.1, 556.2, 435.1–435.3, 455/560–561, 567
See application file for complete search history.

(56) References Cited

U.S. PATENT DOCUMENTS

| | | | |
|---|---|---|---|
| 5,610,972 A | 3/1997 | Emery et al. | |
| 6,141,556 A * | 10/2000 | Dougherty et al. | 455/445 |
| 6,167,064 A | 12/2000 | Cohn et al. | |
| 6,188,911 B1 * | 2/2001 | Wallentin et al. | 455/524 |
| 6,195,545 B1 | 2/2001 | Baker et al. | |
| 6,363,142 B1 | 3/2002 | Stumer | |
| 6,405,041 B1 * | 6/2002 | Mukerjee et al. | 455/445 |
| 6,522,876 B1 | 2/2003 | Weiland et al. | |
| 6,535,730 B1 | 3/2003 | Chow et al. | |
| 6,622,016 B1 | 9/2003 | Sladek et al. | |
| 6,697,478 B1 | 2/2004 | Meldrum et al. | |
| 6,978,004 B1 * | 12/2005 | Levine | 379/211.04 |
| 6,978,132 B1 | 12/2005 | Sladek et al. | |
| 6,999,757 B2 * | 2/2006 | Bates et al. | 455/456.3 |
| 2002/0086666 A1 | 7/2002 | Chen | |
| 2003/0063733 A1 | 4/2003 | Levine et al. | |
| 2004/0147258 A1 | 7/2004 | Dokko | |
| 2004/0180654 A1 | 9/2004 | Chen | |
| 2004/0192350 A1 * | 9/2004 | Pelaez et al. | 455/456.3 |
| 2004/0202305 A1 | 10/2004 | Brennan | |

(Continued)

OTHER PUBLICATIONS

"Automatic 'location based' Call Forwarding", http://www.2its.com/ACF.htm, Printed from the World Wide Web on Oct. 16, 2003.

(Continued)

*Primary Examiner*—Meless Zewdu

(57) ABSTRACT

A method and system for simultaneous ringing in a wireless communication system. Upon receipt of a request to connect a call to a given wireless communication device (WCD), a switch or other entity will determine that the given WCD subscribes to a simultaneous ringing service and will identify one or more other WCDs to simultaneously ring. The switch or other entity will then determine which of those one or more WCDs, if any, are currently operating in the same wireless coverage area as the given WCD and will then simultaneously ring the given WCD and each of the other WCDs, if any, that is determined to be operating in the same wireless coverage area.

17 Claims, 7 Drawing Sheets

U.S. PATENT DOCUMENTS

2005/0063529 A1    3/2005    Meldrum et al.

OTHER PUBLICATIONS

"Understanding Telecommunications, Chapter 6: Network Intelligence and Value-Added Services," http://www.ericsson.com/support/telecom/part-d/d-6-1.shtml, Printed from the World Wide Web on Jan. 31, 2004.

Garg, Vijay K., et al., "Applications of CDMA in Wireless/Personal Communications," Prentice Hall PTR, Chapter 4, Section 4.3-.5, pp. 86-92, 1997, no month listed.

Low, Su-Lin and Schneider, Ron, "CDMA Internetworking: Deploying the Open A-Interface", Prentice Hall PTR, Chapter 3, Section 3.2, pp. 164-187, Chapter 5, Section 5.3, pp. 298-307, and Chapter 10, Section 10.3-.4, pp. 546-553, 2000, no month listed.

La Porta, Thomas F., et al., "Comparison of Signaling Loads for PCS Systems," http://citeseer.nj.nec.com/cache/papers/cs/11341/http:zSzzSzwww.bell-labs.comzSzuserzSztlpzSzpcs_ld.fm.pdf/porta95comparison.pdf, Printed from the World Wide Web on Oct. 28, 2003.

Akyildiz, Ian F., et al., "Mobility Management in Next-Generation Wireless Systems," Proceedings of the IEEE, vol. 87, No. 8, pp. 1347-1384, Aug. 1999.

"Forms of Registration", TIA/EIA/IS-2000.5-A-1, Section 2.6.5.1, Mar. 2000.

"CDMA Tiered Services", TIA/EIA/IS-2000.5-A-1, Section 3.6.7, Mar. 2000.

* cited by examiner

| SUBSCRIBER IDENTITY (E.G., ESN, MIN, DN, IMSI) | SERVICES/ FEATURES | WIRELESS COVERAGE AREA | REGISTERED WCDs |
|---|---|---|---|
| 123-456-7890 | SIMULTANEOUS RINGING (SF) | (E.G., PN OFFSET, CELL_ID, BTS_ID, MSC_ID, VLR POINT CODE, ETC.) | 123-123-0001<br>123-789-0001<br>... |

METHOD AND SYSTEM FOR INVOKING SIMULTANEOUS RINGING

BACKGROUND

1. Field of the Invention

The present invention relates to wireless communications and, more particularly, to methods and systems of providing call services in a cellular communication system.

2. Description of Related Art

Cellular wireless is an increasingly popular means of personal communication in the modem world. People are using cellular wireless networks for the exchange of voice and data over cellular telephones, Personal Digital Assistants (PDAs), wirelessly equipped computers, and other devices. In principle, a user can seek information over the Internet or call anyone over the Public Switched Telephone Network (PSTN) from any place inside the coverage area of the cellular wireless network.

In a typical cellular wireless system, a coverage area is divided geographically into a number of cell sites or cells, each defined by an RF radiation pattern from a respective base transceiver station (BTS) antenna. The BTS antennae in the cells are in turn coupled to a base station controller (BSC), which is then coupled to a switch, such as a mobile switching center (MSC). The MSC may then be coupled to a telecommunications network such as the PSTN and/or the Internet.

When a wireless communication device (WCD) is positioned in a cell, the WCD communicates via an RF air interface with the BTS antenna of the cell. Consequently, a communication can be established between the WCD and other entity on the wireless network or the telecommunications network, via the air interface, the BTS, the BSC and the switch. Such a communication may be referred to as a "call", whether the communication is a traditional voice call or a more advanced data session. To further distinguish between the two, a data session is typically referred to as a data call.

Cellular wireless architecture has also been adopted to deploy fixed wireless local loop (WLL) networks that utilize wireless access methods in place of traditional fixed wireline links to deliver voice and data communications (e.g. telephone and Internet services) to telecommunications users at their residential homes and business offices, for instance. WLL devices usually stay in a relatively fixed location and often connect to AC current rather being battery-powered to support mobility (as in the case of portable cellular telephones, for instance).

For example, a WLL device may be in the form of a fixed WLL hub (or terminal) with wireless capabilities that can be installed within the premises of a residential building or an office building to interconnect traditional wireline terminals, such as a landline telephone, a fax machine, and/or a computer modem, to a wireless network (via a BTS, BSC, and a MSC) using a suitable communication protocol, typically a Code Division Multiple Access (CDMA) protocol. A WLL device can also be a stand-alone WLL phone, or even a WLL payphone, that directly interconnects a user to the wireless network. The wireless network then interfaces with a telecommunications network, such as the PSTN, to enable the WLL device to communicate with other communication terminals, such as by placing and receiving calls.

Early cellular communication systems provided only basic functions associated with call processing, such as simply setting up and disconnecting calls. Today's cellular systems, however, provide a wide array of supplementary services and advanced wireless features made available to wireless users. In general, enhanced or special call services encompass those call features that do more than simply place or terminate telephone calls as dialed.

For example, a user may subscribe to call forwarding service, in which calls directed to the user's WCD device may be forwarded to another phone line. In another example, a three-way calling feature allows a mobile subscriber currently engaged in a two-way call to add in a third party, so that all parties may communicate directly. In yet another example, when a WCD is currently engaged in a call, a call waiting service provides for alerting a user when another call is placed to the WCD. According to the service, a wireless network may send an audible in-band tone over a traffic channel assigned to the WCD for communicating call traffic, thus alerting the user of another incoming call. The user can then connect to the new incoming call by pressing a designated key on the device and can toggle between the two calls if so desired.

Further, many of the services for which a subscriber or group of subscribers is authorized can be turned on and off (i.e., activated and deactivated) or modified. For instance, a subscriber may subscribe to a voice mail service, which directs unanswered calls to voice mail (a type of call forwarding), and the subscriber may be given the ability to turn this service on or off. As another example, the subscriber may be given the ability to set and/or modify the number to which calls to the subscriber should be forwarded.

Although a variety of services currently made available to wireless communications users provide many convenient functions for handling calls, services offering new features are still in demand.

SUMMARY

The present invention provides a method and system for simultaneously ringing multiple wireless communication devices, in response to the wireless communication devices being in the same wireless coverage area.

In one respect, an exemplary embodiment of the invention is directed to a method of responding to a request to connect a call to a given WCD that is operating in a particular wireless coverage area. The method would involve (i) determining that the given WCD subscribes to a simultaneous ringing service and identifying one or more other WCDs to simultaneously ring in accordance with the service, (ii) determining which of the one or more other WCDs, if any, are currently operating in the same wireless coverage area as the given WCD, and (iii) simultaneously ringing the given WCD and each of the one or more other WCDs, if any, that is determined to be operating in the same wireless coverage area as the given WCD.

The exemplary method could be carried out in a mobile switching center, which would be convenient because a mobile switching center is the entity of a wireless network that commonly (i) receives requests to connect calls to the WCDs that it serves and (ii) pages (a/k/a rings) such a WCD upon receipt of such a request. Alternatively, the method could be carried out at another entity, such as at a Home Location Register (HLR) or BSC for instance.

Each of the WCDs could also take various forms. For instance, a WCD could be a mobile WCD such as a portable cell phone or wirelessly equipped computer, or a WCD could be a fixed WCD such as a WLL hub or wall-mounted cell phone. In one preferred embodiment, the given WCD is a portable cell phone, and at least one of the other WCDs (that the network would simultaneously ring when the given WCD is in the same coverage area as the other WCD) is a fixed WCD such as a WLL hub.

The preferred method may further comprise maintaining a profile record for the given WCD, which could indicate (i) that the given WCD subscribes to the simultaneous ringing service (i.e., that the WCD operates under a service account for which that service is authorized) and (ii) that specifies the other WCDs to simultaneously ring (i.e., to simultaneously ring if they are in the same wireless coverage area as the given WCD when the call request comes in). The profile record could be kept in a visitor location register (VLR) of the serving system that is currently serving the given WCD and/or in an HLR with which the given WCD is registered, or it could be kept elsewhere.

In practice, the process of determining which of the other WCDs, if any, are currently operating in the same wireless coverage area as the given WCD could involve determining first what wireless coverage area the given WCD is operating in. This might be inherent, if the entity making the determination knows the answer already. For instance, the information could be inherent to an MSC, since an MSC typically needs to know this information in order to be able to page a WCD upon receipt of a request to connect the call to the WCD. Alternatively, the determination of what wireless coverage area the given WCD is operating in could be made by reference to stored data, possibly maintained by some other entity. In turn, the process of determining which WCDs, if any, are operating in that coverage area could involve making the same determination (in the same or other way) for each of the other WCDs listed in the given WCD's profile, and determining if the wireless coverage areas match.

The wireless coverage area of interest in the exemplary method could also take various forms. As examples, the wireless coverage area could be a cell or cell sector in a cellular communication system, or an MSC serving area or BSC serving area in a cellular communication system. Other examples are possible as well.

In another respect, an exemplary embodiment of the invention could take the form of a simultaneous ringing system for use in a wireless communication network. Such a system could include a stored profile record for a given WCD that is currently operating in a given wireless coverage area, and service logic executable in response to receipt of a request to connect a call to the given WCD. The stored profile record could indicate that the given WCD subscribes to a simultaneous ringing service and could indicate one or more other WCDs to simultaneously ring in accordance with the service. And the service logic could operate (i) to refer to the profile record so as to identify the one or more other WCDs, (ii) to determine which of the one or more other WCDs, if any, are currently operating in the same wireless coverage area as the given WCD, and (iii) to simultaneously ring the given WCD and each of the one or more WCDs, if any, that is determined to be currently operating in the same wireless coverage area as the given WCD.

Advantageously, in the event a call is placed to a user's given WCD that is subscribed for a simultaneous ringing service, a number of the user's other WCDs currently operating in the same wireless coverage area as the given device can be made to simultaneously ring. The wireless coverage area can conveniently correspond to a particular geographic area, for instance.

These and other aspects and advantages will become apparent to those of ordinary skill in the art by reading the following description, with reference where appropriate to the accompanying drawings. Further, it should be understood that the embodiments noted in this summary are not intended to limit the scope of the invention as claimed.

BRIEF DESCRIPTION OF THE DRAWINGS

An exemplary embodiment of the present invention is described herein with reference to the drawings, in which:

FIG. 6 illustrates an exemplary profile record; and

DETAILED DESCRIPTION OF AN EXEMPLARY EMBODIMENT

1. Overview

Figure 1:
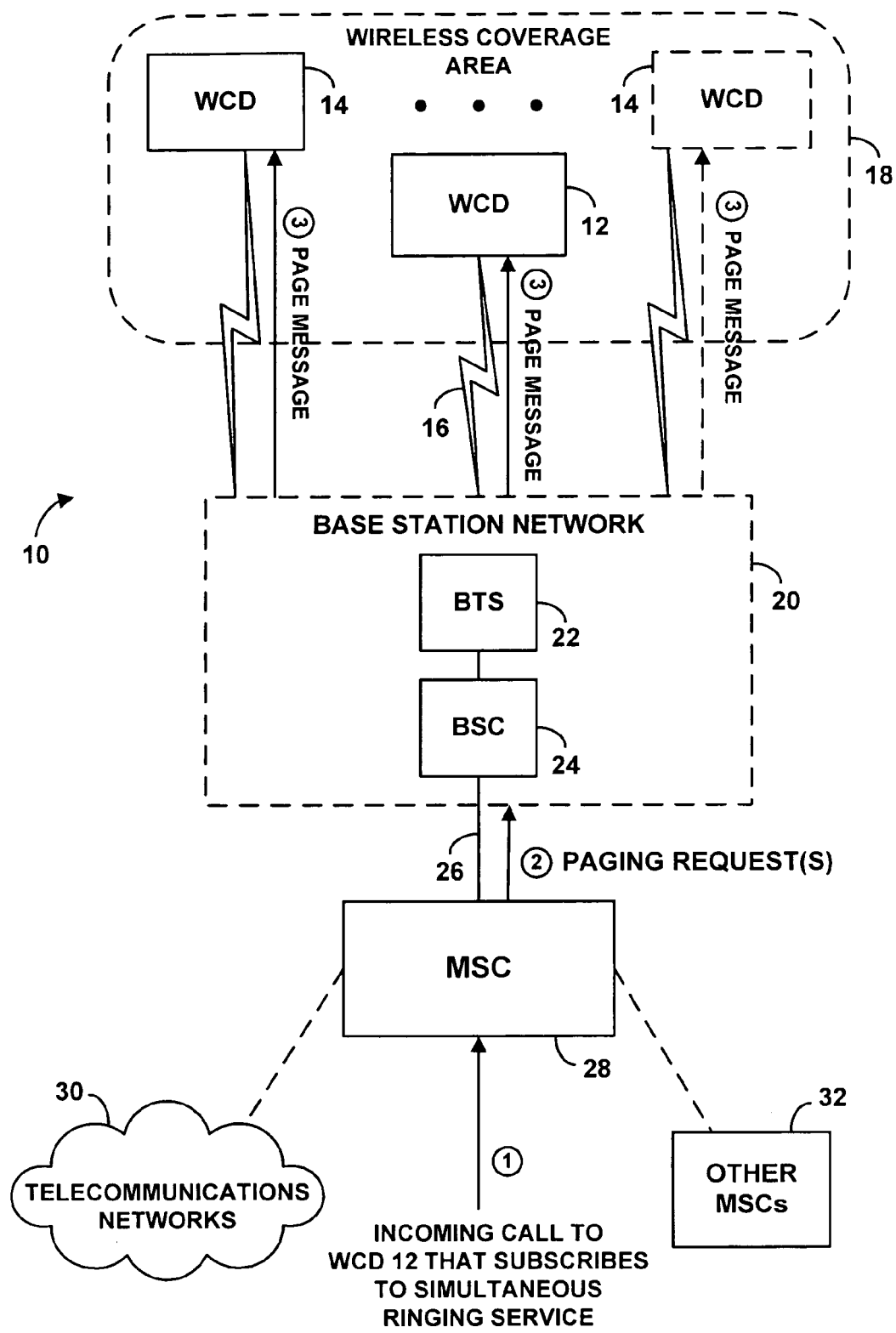
FIG. 1 is a block diagram of a wireless network in which the exemplary embodiment can be employed.

Referring now to the drawings, FIG. 1 provides a simplified block diagram of a wireless network 10 in which an exemplary embodiment can be employed. The wireless network includes a WCD 12 coupled via a wireless radio link, such as an RF air interface 16, to a base station network 20, which in turn communicates with a switch, such as an MSC 28. Network 10 also includes one or more WCDs 14 wirelessly coupled to base station network 20 that are each currently operating in the same wireless coverage area 18 as WCD 12.

Base station network 20 is generally representative of a radio infrastructure that enables a respective WCD operating in wireless coverage area 18 to gain access into wireless network 10 via an air interface and manages wireless communications over the air interface with the WCD, such by allocating radio channels for communicating voice and/or data traffic to/from the WCD. The air interface communication can occur using any of a variety of suitable protocols known in the art, such as CDMA, Time Division Multiple Access (TDMA), Global System for Mobile Communication (GSM), or 802.11x, for instance.

By way of example, base station network 20 may include an exemplary BTS 22 that radiates to define an RF coverage within a given cell site, or a cell, and communicates through the air interface with a respective WCD currently operating in the given cell. BTS 22 may then be coupled with a BSC 24, which typically controls the functions of the BTS and sets up radio resources (e.g., frequency allocation for the air interface) to facilitate wireless communication with WCDs served by the BTS. The BSC is then typically coupled through a suitable communication interface 26 (commonly referred to as the "A-Interface" by the wireless industry) to MSC 28, thus interconnecting the respective WCD with MSC 28.

It should be understood, however, that the elements and arrangements depicted in FIG. 1 and other figures throughout this document are shown for purposes of example only. Variations are possible. For instance, although FIG. 1 depicts a BSC as controlling a single BTS, the BSC may in fact function to control multiple separate BTSs (i.e., cells) operating in the BSC serving area. Similarly, the MSC may function to control multiple separate BSCs operating within the MSC serving area rather than a single BSC as shown in FIG. 1. As another example, the BSC functions may be integrated into the MSC, thereby eliminating the separate BSC entity. As still another example, although FIG. 1 shows the BSC and BTS as separate entities, these two entities could be co-located or could otherwise be viewed cooperatively as a base station subsystem (BSS). Still other variations are possible as well.

MSC 28 serves as a general control element for a wireless network. Typically, it is responsible for setting up and switching calls to and from the cells in its serving area, interfacing call traffic from the wireless network with other telecommunications networks 30 (such as the PSTN, the Integrated Services Digital Network ("ISDN") and/or the Internet, for instance), monitoring traffic to facilitate billing, and performing various other functions.

For example, the MSC typically controls handoff of signaling and call traffic between BSCs in its serving area as a WCD that is mobile transitions from one BSC serving area to another. In another example, the MSC often carries out call processing associated with various supplementary services and wireless features that may be authorized (or made available) for the WCD. The BSC in turn transfers the necessary feature data and/or signaling indicative of user actions (e.g., turning the feature on or off) between the MSC and the WCD.

As shown in FIG. 1, MSC 28 also provides connectivity with other switches (e.g., other MSCs 32) via dedicated signaling trunks (e.g., SS7 trunks according to IS-41 industry standards or other suitable signaling protocols), such that a WCD that is located outside coverage areas considered to be its home system, e.g., a particular MSC serving area where a user of the WCD subscribed to wireless service, can communicate via a different system. For instance, MSC 28 can deliver calls to a WCD that is registered for wireless service in the serving area of MSC 28 but that has roamed into a different MSC serving area.

Each of the exemplary WCDs shown in FIG. 1 may take various forms. For instance, the exemplary WCD could be a mobile device, such as a portable cell phone (e.g., a 3G mobile phone), a wireless car phone, or a wirelessly equipped computer (that may connect to a Voice-over-IP (VoIP) telephone, for instance). The WCD could also be a fixed device, such as a fixed WLL device (e.g., a stand-alone WLL phone, a WLL payphone, or a WLL hub (or terminal) providing wireless connectivity to other communication devices such as landline telephone(s), computer modem(s), and/or fax machine(s)) or a wall-mounted cell phone. Example WLL devices, including those mentioned herein, are readily available from companies such as Axesstel, Inc.

Traditionally, when a call is placed to a given WCD operating in a wireless coverage area, a serving network responsively pages the given WCD. More particularly, when an MSC receives a request to connect a call to a given WCD operating in wireless coverage area(s) served by the MSC, the MSC responsively pages, or rings, the given WCD. The call request may be initiated by various communication terminals, such as another WCD served by the same MSC or a different MSC, VoIP telephone connected to the MSC through the Internet, or a traditional landline telephone connected through the PSTN, for instance.

Note that, as used in this document, the act of "ringing" a WCD may refer to (i) paging the WCD in response to an incoming call (e.g., sending a page message for the call to the WCD), (ii) causing the WCD to ring or produce any other form of alert in response to the incoming call, or (iii) a combination of both paging the WCD and causing ringing, or alerting, at the WCD.

As an example, when a call for WCD 12 operating in wireless coverage area 18 comes in from a communication terminal on the PSTN, MSC 28 may signal to BSC 24, such as by sending a Paging Request message to BSC 24 across communication interface 26, to inform the BSC of the pending call. The BSC may in turn transmit a page message (e.g., a General Page message as specified by the IS-95/IS-2000 CDMA standards) via BTS 22 to WCD 12 to determine whether the WCD is available to receive the call. The MSC has the option of sending the Paging Request message to each BSC in its serving area or to only the BSC that is currently serving WCD 12 (assuming that the MSC has that information).

If WCD 12 is idle, i.e., powered-up and not currently engaged in a call with another communication terminal, WCD 12 is preferably tuned to a dedicated forward control channel(s) (such as paging channel(s) in accordance with the CDMA standards) and can receive and acknowledge the page message transmitted from the BSC. WCD 12 will then normally receive additional system information and call setup parameters from the BSC/MSC, including a suitable alert message to cause ringing at WCD 12.

Note that WCD 12 may alert the user of the incoming call through another communication terminal. For instance, WCD 12 may cause another communication device to ring in response to the incoming call. Examples of WCDs that may operate in this manner include a WLL hub coupled to a PSTN telephone or a wireless base terminal coupled to a handset, as in a typical wireless car phone or a wall-mounted cell phone arrangement, for instance.

According to an exemplary embodiment of the invention, in response to a request to connect a call to a given WCD, a determination can be made that the given device subscribes to a simultaneous ringing service. The service would then provide for simultaneously ringing, or paging, the given WCD and particular one or more other WCDs, if any, that are currently operating in the same wireless coverage area as the given device. In effect, the given device and the particular one or more other WCDs currently operating in the same wireless coverage area may ring simultaneously in response to the call request for the given WCD.

Figure 2:
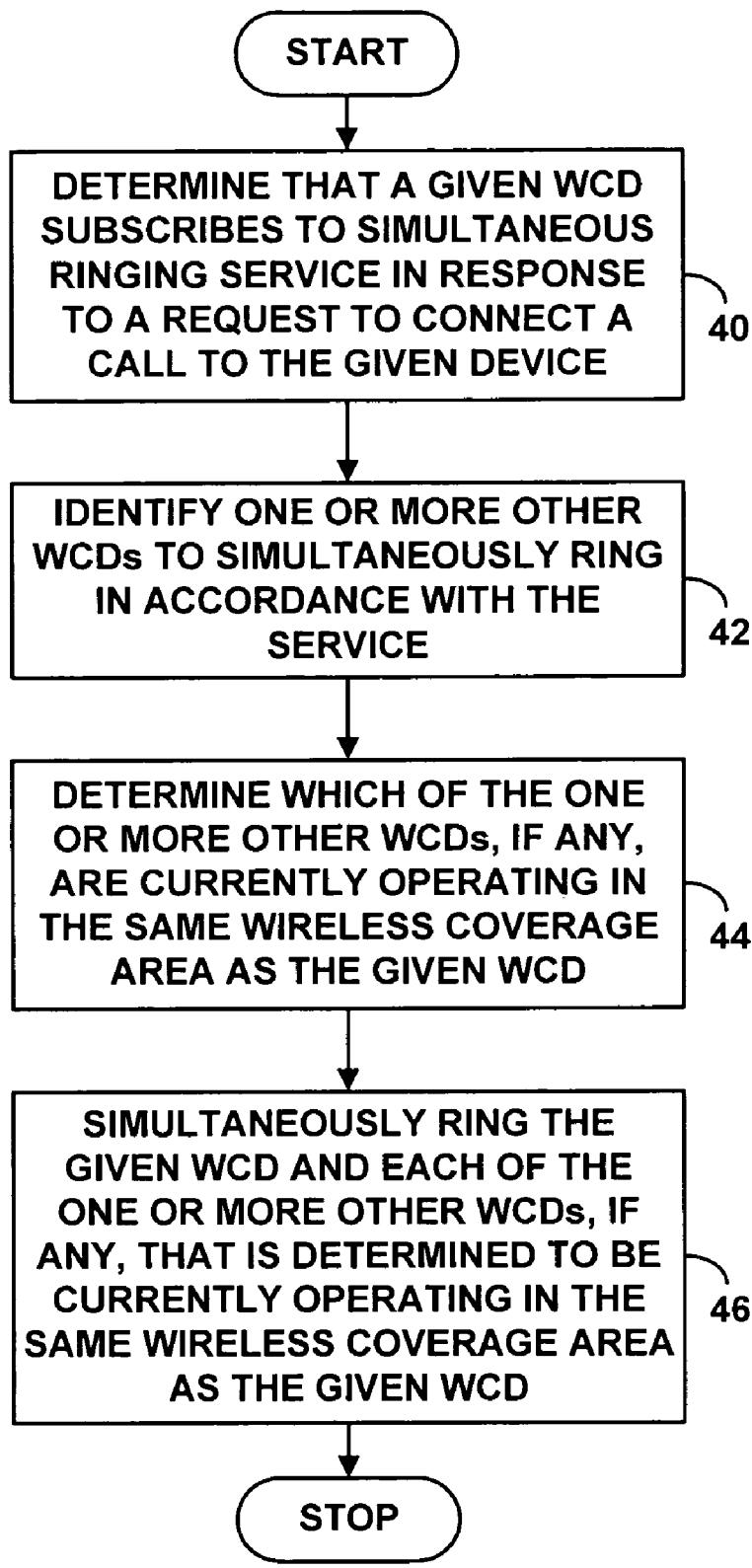
FIG. 2 is a flow chart depicting functions that may be employed in accordance with the exemplary embodiment.

FIG. 2 is a flow chart generally depicting a set of functions that could be carried out in accordance with the exemplary embodiment, in the arrangement in FIG. 1 for instance.

At step 40, upon receipt of a request to connect a call to a given WCD, a determination is made (by a designated network entity) that the given WCD subscribes to a simultaneous ringing service and, at step 42, one or more other WCDs to simultaneously ring in accordance with the service are identified. For instance, in FIG. 1, when MSC 28 receives a request to connect a call to WCD 12, MSC 28 may determine that WCD 12 subscribes to the simultaneous ringing service and may responsively identify one or more other WCDs to simultaneously ring in accordance with the service. By way of example, MSC 28 could identify the one or more WCDs 14 as those devices to simultaneously ring.

Step 44 then involves determining which of those other WCDs, if any, are currently operating in the same wireless coverage as the given WCD and, at step 46, simultaneously ringing the given WCD and each of the one or more other WCDs, if any, that is determined to be operating in the same wireless coverage area as the given WCD.

For instance, MSC 28 could determine that each of the one or more WCD 14 is currently operating in the same wireless coverage area 18 as WCD 12 and, in response, simultaneously ring WCD 12 and each of the one or more WCDs 14. By way of example, in the wireless network arrangement of FIG. 1, MSC 28 could responsively send paging request(s) to base station network 20, which could in turn simultaneously broadcast respective page messages to both WCD 12 and each of the one or more WCDs 14 that is currently operating in the same wireless coverage area 18.

2. Specifying Wireless Coverage Area

As noted above, the simultaneous ringing service provides for simultaneously ringing multiple wireless communication devices, to the extent the wireless communication devices are currently operating in the same wireless coverage area, such as exemplary wireless coverage area 18. The exemplary wireless coverage can be defined in various ways, and many examples are possible.

As is typical, coverage areas within wireless systems are geographically divided into a number of cells. Most cells are usually further partitioned into smaller coverage areas such as a number of sectors, each defined respectively by radiation patterns from directional antenna components on a BTS. For example, in a CDMA wireless network, cells are typically subdivided into three sectors, each sector distinguished from adjacent physical sectors by a pseudo-random noise (PN) offset.

Figure 3:
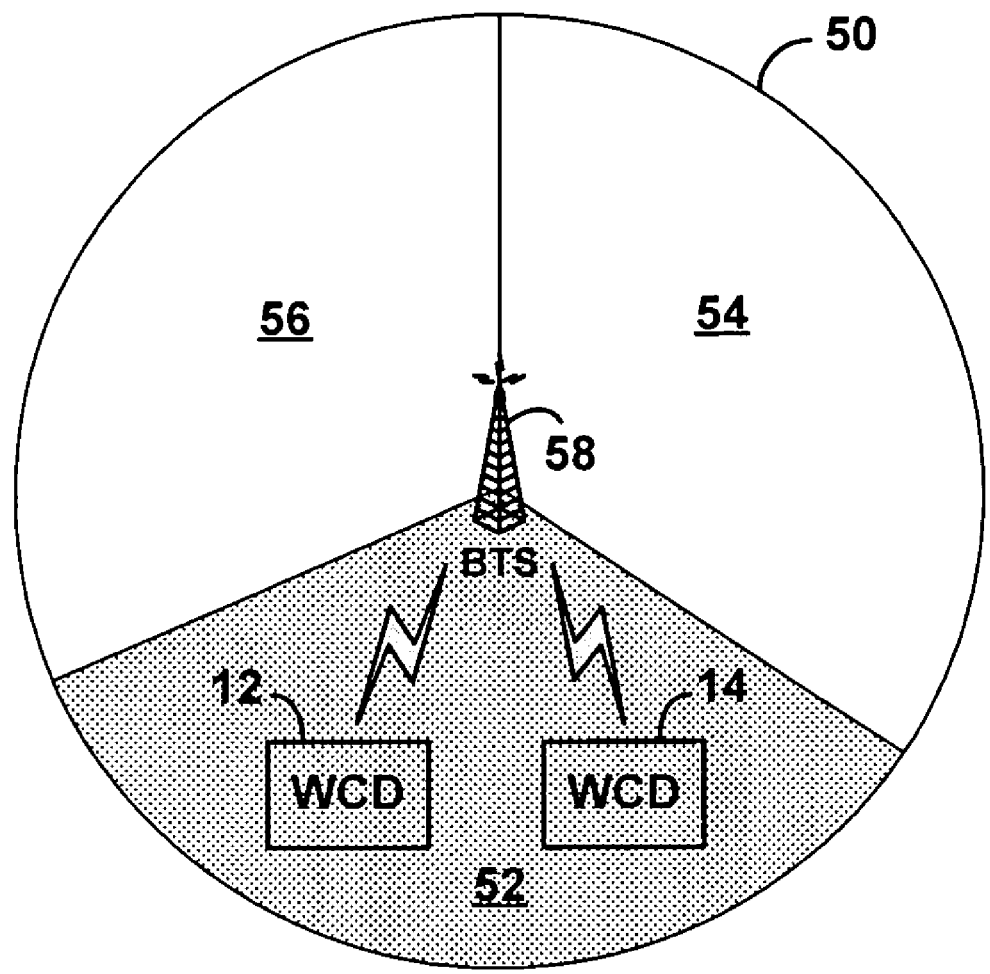
FIG. 3 is an idealized representation of a single cell to illustrate examples of a wireless coverage area.

FIG. 3 illustrates one such cell 50 in greater detail, idealized as a circle. Cell 50 is shown subdivided into three sectors 52, 54 and 56, each defined by a respective directional RF radiation pattern on a BTS 58, although a cell could have more sectors for greater coverage granularity (e.g., six sectors) or possibly fewer sectors.

Thus, in one example, exemplary wireless coverage area 18 may include a single cell, such as exemplary cell 50, or a single cell sector. By way of example, FIG. 3 illustrates WCDs 12 and 14 each currently operating in cell sector 52 (shown highlighted in FIG. 3) that could be considered as wireless coverage 18.

Note, however, that a wireless carrier may utilize a variety of other cell-partitioning schemes rather than cell sectoring. For example, the wireless carrier may split a coverage area of a cell into physically smaller cells, each served by its own BTS (such as microcells and picocells (as those defined in a 3G cellular Personal Communications System (PCS), for example), and thus may provide for specifying the cell coverage area in various other ways. For instance, a "cell" could refer to a picocell that normally provides wireless coverage within a small environment such as an indoor office area.

In another example, wireless coverage area 18 may consist of a group of cells and/or sectors, whether or not contiguous. For instance, exemplary wireless coverage area 18 may consist of a group of cells that make up a particular BSC serving area, multiple BSC serving area(s), an MSC serving area, or possibly multiple MSC serving areas. The wireless coverage area may also consist of a group of individual cells and/or sectors from a number of different serving areas. Those skilled in the art will readily recognize that many variations are possible.

Figure 4:
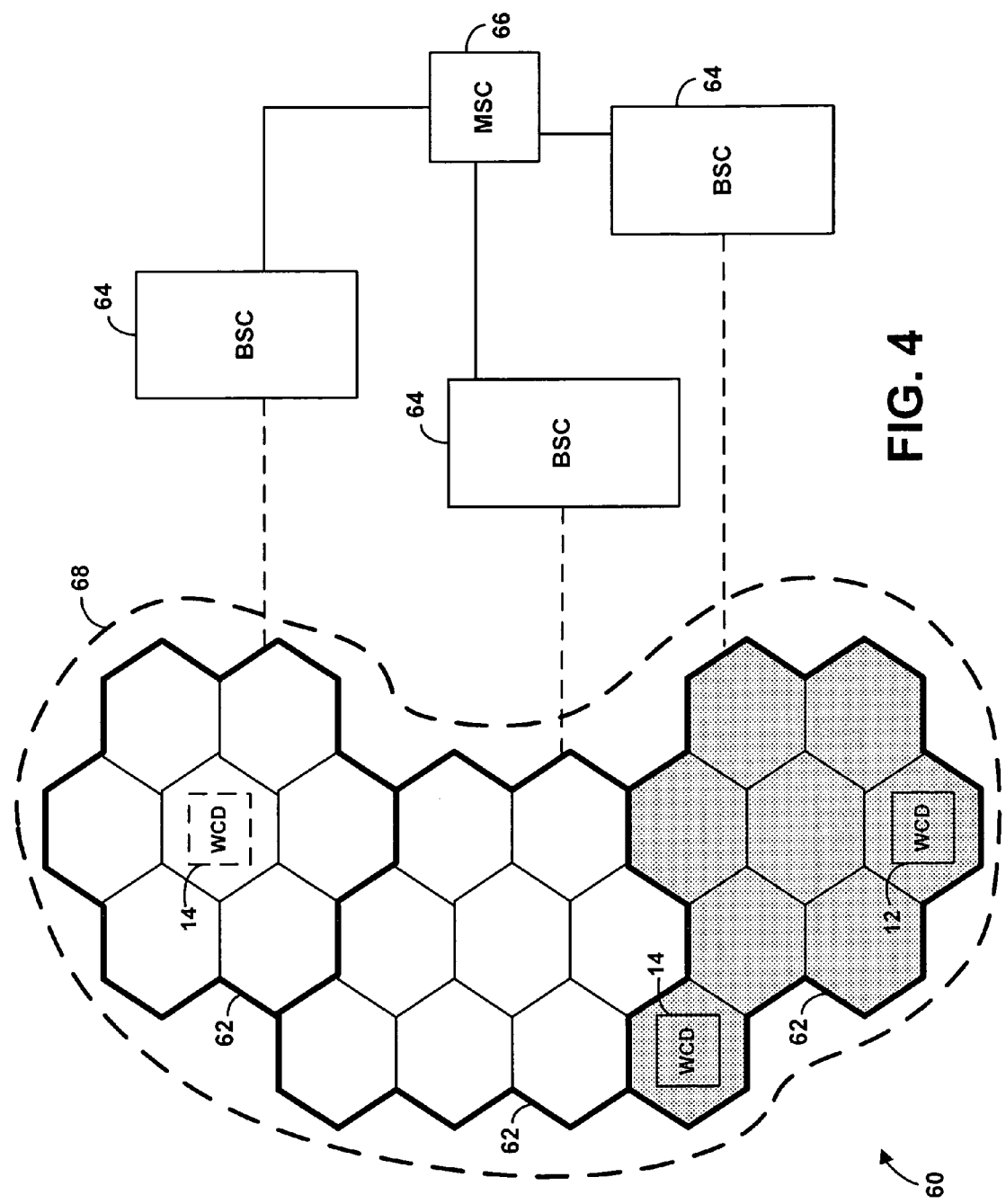
FIG. 4 is an arrangement of multiple cells to illustrate examples of a wireless coverage area.

FIG. 4 illustrates a cellular arrangement 60 that includes multiple cells or cell sites that are grouped into individual BSC serving areas 62. Each BSC serving area 62 is controlled by a respective BSC 64, and each BSC 64 is in turn controlled by an MSC 66 that manages an MSC serving area 68.

FIG. 4 depicts each of the cells in an idealized fashion, as a hexagon that does not overlap other cells. In reality, however, most cells will overlap with neighboring cells and may vary widely in shape and size. Further, MSC serving area 68 may include fewer or more BSC serving areas 62 than shown in FIG. 4.

In one example, wireless coverage area 18 may be a single BSC serving area, such as exemplary BSC serving area 62 highlighted in FIG. 4. Thus, when a given WCD and one or more other WCDs are currently operating in the same BSC serving area, both the given WCD and each of the one or more WCDs could be considered to currently operate in the same wireless coverage area. For purposes of illustration, FIG. 3 shows respective WCDs 12 and 14 that are each currently operating in the same BSC serving area 62.

In another example, wireless coverage area 18 could encompass entire MSC serving area 68. Thus, exemplary WCD 12 and WCD 14 could be operating in two different BSC serving areas 62 as shown in FIG. 4, but could still be considered to be operating in the same wireless coverage area for the purpose of a simultaneous ringing service. In effect, as shown generally in FIG. 1, if MSC 66 receives a request to connect a call to WCD 12 that subscribes to the service, MSC 66 could send a paging request to each respective BSC 64 currently serving WCD 12 and WCD 14 (that the MSC is to ring simultaneously in accordance with the service). The respective BSCs would in turn page WCD 12 and WCD 14 that are each currently operating in the respective BSC serving area.

The determination of which sector(s) and/or cell(s) in a given wireless network could be specified as wireless coverage area 18 can be carried out in a variety of ways. For instance, a wireless carrier may offer the simultaneous-ringing service within predefined wireless coverage areas, such as specific sector(s) and/or cell(s) that cover given geographic area(s) (e.g., given geographic regions in metropolitan areas across its wireless network(s)) and/or may allow users who subscribe to the service to arbitrarily specify the wireless coverage area in accordance with the service to suit their individual needs. The wireless carrier could then record that wireless coverage definition in the user's profile record for instance.

As an example, a user of a portable cell phone that is authorized for the simultaneous-ringing service may request that incoming calls are directed to both the user's cell phone and one or more other WCDs specified for the service, whenever the user's cell phone and any of the other specified WCDs are currently operating in a particular geographic area. For instance, the user may desire a landline telephone connected through a WLL hub installed at the user's home residence and the user's cell phone to ring simultaneously whenever the user is operating the cell phone within a given geographic area where the user's home residence is located. The wireless carrier may then determine that the given geographic area is substantially encompassed by a given cell sector and may record in the user's profile record an indication that the wireless coverage area is the given cell sector. Various other examples are possible as well.

3. Invoking Simultaneous Ringing Service for Multiple WCDs

As noted above, when a request comes into a wireless network to connect a call to a given WCD, a switch, such as an MSC, may determine that the given WCD subscribes to a simultaneous ringing service and may identify one or more other WCDs to simultaneously ring. The switch may then determine which of the one or more other WCDs, if any, are currently operating in the same wireless coverage area as the given WCD and may simultaneously ring the given WCD and each of the one or more other WCDs, if any, that is determined to be operating in the same wireless coverage area as the given WCD.

In general, control information about call processing for a WCD (or generally a subscriber) can be defined and recorded in database(s) that may be referenced by a serving system comprising a switch and other associated entities during call processing. This set of parameters is considered as a subscriber profile. When the switch receives a request to complete a call to or from a subscriber, the switch may consult the subscriber's profile in the database for call-handling instructions and/or whether it should carry out certain call processing logic itself, such as to execute an appropriate set of service logic specifying how to provide a special service to the call.

a. Exemplary Network

Figure 5:
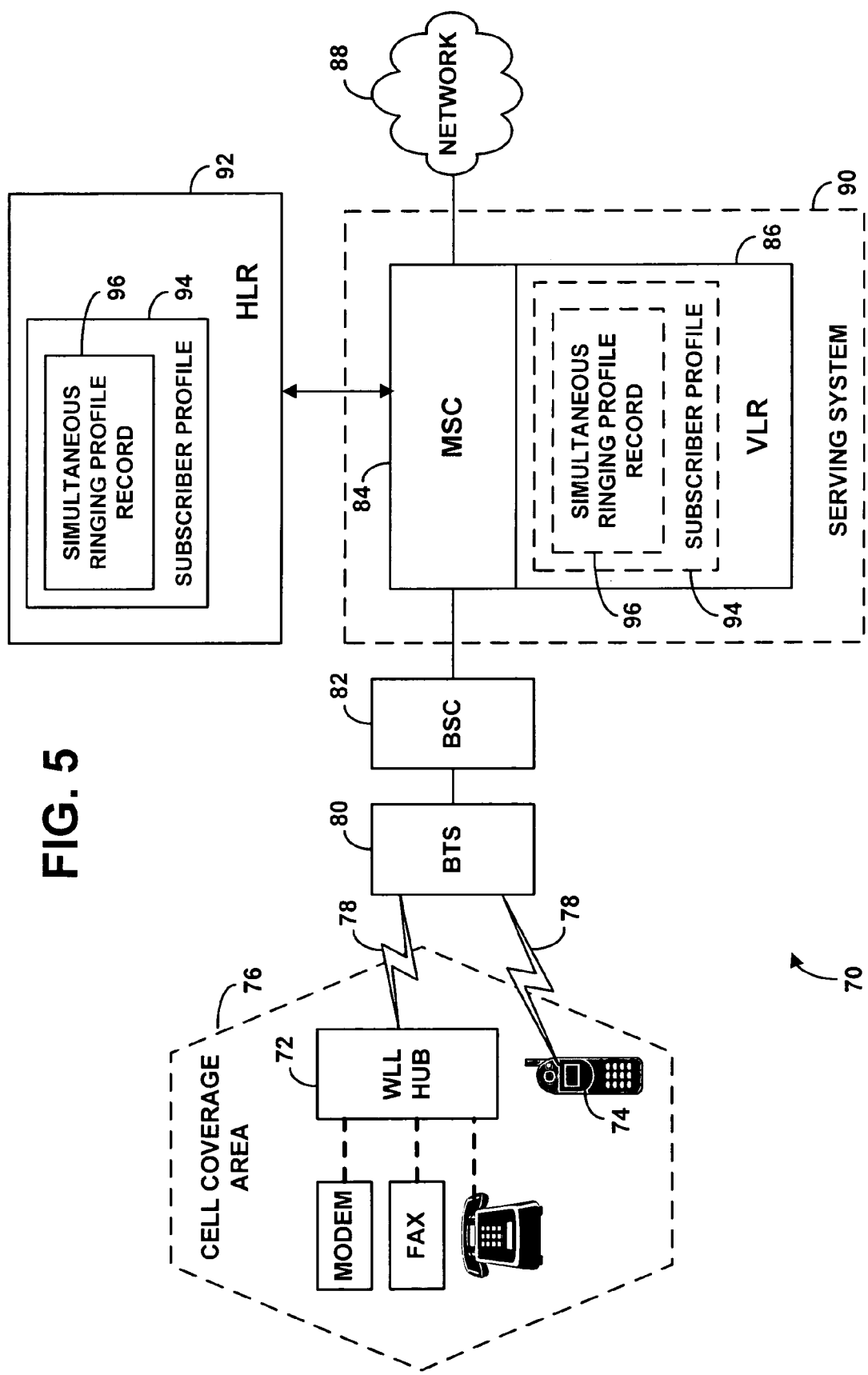
FIG. 5 is a block diagram showing in more detail components of a wireless communication network arranged to carry out the exemplary embodiment.

While the arrangement shown in FIG. 1 is generally representative of a network in which the invention can be employed, FIG. 5 illustrates a more particular example of a wireless communication network 70 in which the invention can be carried out.

As illustrated in FIG. 5, wireless communication network 70 includes a WLL hub 72 (which could provide wireless connectivity to multiple communication terminals, such as a telephone, fax machine, and/or modem) and a portable cell phone 74 that are both currently operating within a cell coverage area 76 and are arranged to communicate over a respective RF air interface 78 with a BTS 80. BTS 80 is coupled to a BSC 82, which in turn is coupled to an MSC 84 that is co-located with a VLR 86. The MSC provides connectivity with a network 88, which could be the PSTN, a packet-switched network (e.g., the Internet), or some other type of network. As further shown in FIG. 5, the combination of MSC 84 and VLR 86 defines a serving system 90 that communicates with an HLR 92.

Normally, when a user signs up for a wireless service, a subscriber profile is created in an HLR, such as exemplary HLR 92. The HLR is a database that stores all subscriber profile information, including service profile defining enhanced services (e.g., Short Message Service) and call service features (e.g., call waiting, three-way calling, and/or call forwarding) authorized for use by the subscriber, identity parameters associated with the subscriber (e.g., an Electronic Serial Number (ESN), Mobile Identification Number (MIN), Directory Number (DN), and/or International Mobile Station Identification (IMSI)), and current location parameters. By way of example, FIG. 5 illustrates a subscriber profile 94 stored in HLR 92.

Additionally, subscriber profile 94 can optionally convey a variety of useful control parameters to assist in call processing. As an example, and without limitation, subscriber profile 94 can include the "CallingFeaturesIndicator" parameter, which defines authorization (i.e., whether the subscriber operates under a service account for which a particular call service feature is authorized) and activity states for the subscriber's features (i.e. whether the service feature is currently turned on or turned off (i.e., activated or deactivated)). Thus, if the particular call service feature is both authorized and activated, the functions associated with the feature are executed when processing a call to or from the subscriber.

Wireless communication network 70 also includes VLR 86 co-located with MSC 84 (although the two can instead be separate physical entities or can be combined into a single MSC/VLR entity) that serves as a temporary database for storing subscriber profile information to validate and serve subscribers during call initiations and terminations. FIG. 5 shows VLR 86 as a part of serving system 90 that includes single MSC 84, although VLR 86 could in fact serve multiple MSCs. In practice, however, it is more typical for HLR 92 to serve more than one MSC. For example, HLR 92 may contain subscriber profile information for every subscriber across multiple MSCs deployed by a wireless carrier.

VLR 86 obtains subscriber profile, such exemplary subscriber profile 94 (shown in FIG. 5 as being temporarily stored in VLR 86), from subscriber's HLR when the subscriber is currently operating in the coverage area(s) serviced by the VLR (even in the subscriber's home system). In particular, before a WCD can receive calls (or other call services), the WCD normally registers with the system that is currently serving the WCD. Registration (also known as "location updating") is a convenient method by which the WCD reports its current network location and operating parameters to its serving system. The serving system can then properly direct calls and other services (e.g., messages) to the WCD.

For instance, MSC 84 can use the registered location of the WCD to efficiently page the WCD for an incoming call. As an example, MSC 84 can page one specific cell from which the WCD last registered (e.g., by using the last registered Cell ID that uniquely identifies an individual cell within a wireless network), or a specified group of cells (e.g., using the last registered Location Area Code (LAC) that corresponds to a group cells, usually under the domain of one or more BSCs located in the same MSC service area) rather than flood-paging all network cells in order to locate the WCD for the call.

Typically, when a WCD (identified by its MIN, DN, and/or ESN, for instance) is first powered up for service or enters a wireless coverage area serviced by serving system 90, the WCD registers with serving system 90 (e.g., WLL hub 72 and portable cell phone 74 may each send a respective registration message via BTS 80 to BSC 82 that forwards the registration parameters to MSC 84), which in turn engages in signaling with HLR 92. If the HLR identifies a subscriber profile for the WCD in its records, the HLR updates the subscriber profile with the current status and location of the WCD and returns the updated subscriber's profile information to be temporarily stored in VLR 86 for reference.

Serving system 90 may also determine that the WCD is a visitor that is currently roaming outside its home system. The serving system can then engage in signaling communication with the HLR in the subscriber's home system (e.g., the serving system can determine the network address (e.g., SS7 "point code") of the subscriber's HLR, typically by reference to a local table (based on inter-system roaming agreements or other information) (i) to notify the home HLR where the subscriber is located (e.g., by providing an MSC_ID that consists of the System Identity (SID) and Switch Number of the serving system, and a VLR point code to uniquely identify the subscriber's currently serving MSC/VLR) and (ii) to obtain the subscriber's profile, including services and calling features authorized for use by the subscriber.

Upon receipt of the subscriber's current profile from the subscriber's HLR, the serving system can store the subscriber profile in its VLR for later reference. In turn, the subscriber's home HLR database is updated with the subscriber's newly registered system location, so that incoming calls can be routed from the home system to the subscriber's currently serving system.

The WCD's entry in the VLR database typically remains active for a predefined period of time, or until the WCD deregisters by powering down or moving into a new serving system. Also, whenever the subscriber's service profile at HLR 92 changes in some way that may impact the profile recorded in serving system 90, the HLR can be programmed to send an updated profile to the serving system, which the serving system will record in its VLR.

An HLR-maintained subscriber profile may change for various reasons. For instance, an administrative action could cause a new feature to be added to the subscriber's profile or an existing subscriber feature to be activated. As another example, a user may activate or de-activate a particular service (such as call forwarding or call waiting, for instance) by sending (e.g., dialing) a feature code (or a feature code string), which is a specific digit sequence for use in activating, deactivating or modifying particular service features. A feature code usually consists of a preceding asterisk (*) or double asterisk (**) followed by a series of numeric digits (0 through 9).

Thus, if the user activates or deactivates the particular service, serving system 90 would forward the feature code to HLR 92, and HLR 92 would update the subscriber's profile to reflect the service activation. The HLR may then send the updated subscriber profile to serving system 90 to be stored in VLR 86.

By way of example, if MSC 84 receives an incoming call to a WCD that subscribes to a call waiting feature, MSC 84 may first query VLR 86 and determine that the WCD is busy (i.e., engaged in a call). Based on the WCD's profile stored in the VLR, MSC 84 may also determine that the call-waiting feature is both authorized and currently activated. In response, the MSC may invoke the call-waiting feature by playing an in-band tone to alert the user of the WCD of the incoming call.

B. Profile Record and Service Logic

As noted above, the method of providing simultaneous ringing service may include maintaining a profile record for a given WCD to facilitate determination that the given WCD subscribes to the service and identify one or more WCDs to simultaneously ring in accordance with the service. Typically associated with a given service is also a service logic, which is the software specifying how to provide the given service.

In particular, the service logic could include call processing instructions executable by a processor in response to receipt of a request to connect a call to the given WCD that would specify how to handle the call. For instance, in accordance with the simultaneous ringing service, the service logic could operate (i) to refer to the profile record so as to identify the one or more other WCDs, (ii) to determine which of the one or more other WCDs, if any, are currently operating in the same wireless coverage area as the given WCD, and (iii) to simultaneously ring the given WCD and each of the one or more WCDs, if any, that is determined to be currently operating in the same wireless coverage area as the given WCD.

FIG. 5 illustrates one embodiment, in which a simultaneous ringing profile record 96 is conveniently stored in HLR 92 and/or VLR 86 as a part of exemplary subscriber profile 94. However, the simultaneous ringing profile record could be kept in any other suitable data storage element that would be accessible by a network entity or a combination of entities executing the service logic functions associated with the simultaneous ringing service.

FIG. 6 illustrates in greater detail exemplary profile record 96 that can be provisioned in an HLR and/or VLR database, or any other data storage element selected for storing simultaneous-ringing service parameters. As shown in FIG. 6, exemplary parameters stored in profile record 96 may include a "Subscriber Identity" field, "Services/Features" field, a "Wireless Coverage Area" field, and a "Registered WCDs" field.

The "Subscriber Identity" field can specify suitable parameter(s) to uniquely identify a given WCD that operates under a service account for which the simultaneous ringing service is authorized. Exemplary "Subscriber Identity" field parameters may include an ESN, MIN (i.e., a 10-digit number that identifies a mobile WCD), DN (i.e., a number that can be dialed from the PSTN network to a WCD, and which could be the same or different from the MIN (in the case of a mobile WCD)), and/or IMSI.

In one embodiment, profile record 96 can be kept in a VLR and/or HLR as shown in FIG. 5, and the Identity parameter(s) may be in the same form as those listed for identifying subscriber service accounts within the VLR and/or HLR. By way of example, the exemplary profile record shown in FIG. 6 identifies the given device by its DN and/or MIN.

The "Services/Features" field lists a descriptive name of a subscribed service for which the profile record is provided. As such, "Services/Features" field could simply list the name "Simultaneous Ringing". The service name could also be abbreviated, e.g., as an "SF". The use of abbreviations in reference to call service features names is common. For instance, "CW" refers to "call waiting", "3WC" refers to "three-way calling", etc.

The "Wireless Coverage Area" field may then list parameters indicative of a wireless coverage area in which the simultaneous ringing service is to be invoked for the given device and one or more other WCDs listed under the "Registered WCDs" field. In particular, the simultaneous ringing of the given WCD and another WCD specified under "Registered WCDs" is invoked when both the given WCD and the other WCD are currently operating in the wireless coverage area indicated by the "Wireless Coverage Area" field.

The wireless coverage area parameters can take any of a variety of forms, and can be listed individually or in any suitable combination, depending on the extent of coverage provided by the wireless coverage area. Example parameters that may be employed to denote the wireless coverage area include a sector PN offset, Cell ID (and/or a Sector Number within the cell identified by the Cell ID), BTS identification (BTS_ID), LAC, BSC and MSC point codes (e.g. to designate respectively BSC and MSC serving area), MSC_ID and/or VLR point code. Of course many examples are possible.

As mentioned above, the "Registered WCDs" field then lists the one or more WCDs to simultaneously ring in accordance with the service. As in the case of the "Subscriber Identity" field, suitable parameter(s) that uniquely identify each of the one or more WCDs can be used. By way of example, the exemplary profile record shown in FIG. 6 identifies two WCDs by their MINs. However, any number of WCDs can be listed in that field.

The "Registered Devices" parameters may be provisioned into profile record 96 by a wireless carrier. For instance, a user authorized for the simultaneous ringing service may specify one or more other WCDs to be registered for the service, and the wireless carrier may download this information into the profile record. Alternatively, the simultaneous ringing service may allow a user to register the one or more other WCDs through the use of an appropriate feature code, such as traditionally done to register "forward-to number" in a call-waiting feature, or through an online interface.

For example, the user could key in a special feature code assigned by the wireless carrier for the purpose of registration of the simultaneous ringing service parameters. The user may then key in the identity parameters, such as DNs, of the one or more other WCDs that the user wants the network to simultaneously ring in accordance with the service. For example, the user may key in the feature code string and then could sequentially key in the DNs of the one or more other WCDs, pressing a pound sign (#) for instance, to delimit particular sequences of digits respectively denoting each DN. The registration feature code would also allow the user to directly modify those parameters whenever any changes are desired, such as when the user wishes to register a new set of WCDs for the simultaneous ringing service.

By using an assigned feature code, the user could also activate or deactivate the simultaneous service in a similar manner. As an example, to activate the simultaneous ringing feature, the user may enter the string "*XY" (where "XY" represents a specific digit combination) and press the SEND key on the user's device. To deactivate the feature, the user could enter "*XYZ" and press the SEND key. The activation/deactivation requests could be sent to a network entity (e.g., an MSC), which would then update a service profile associated with the given user. For instance, the simultaneous ringing profile record in HLR 92 database and/or VLR 86 database could be marked as active (e.g., the "Calling-FeaturesIndicator" parameter associated with the profile record could indicate an active status of the simultaneous ringing service).

c. Exemplary Operation

Figure 7:
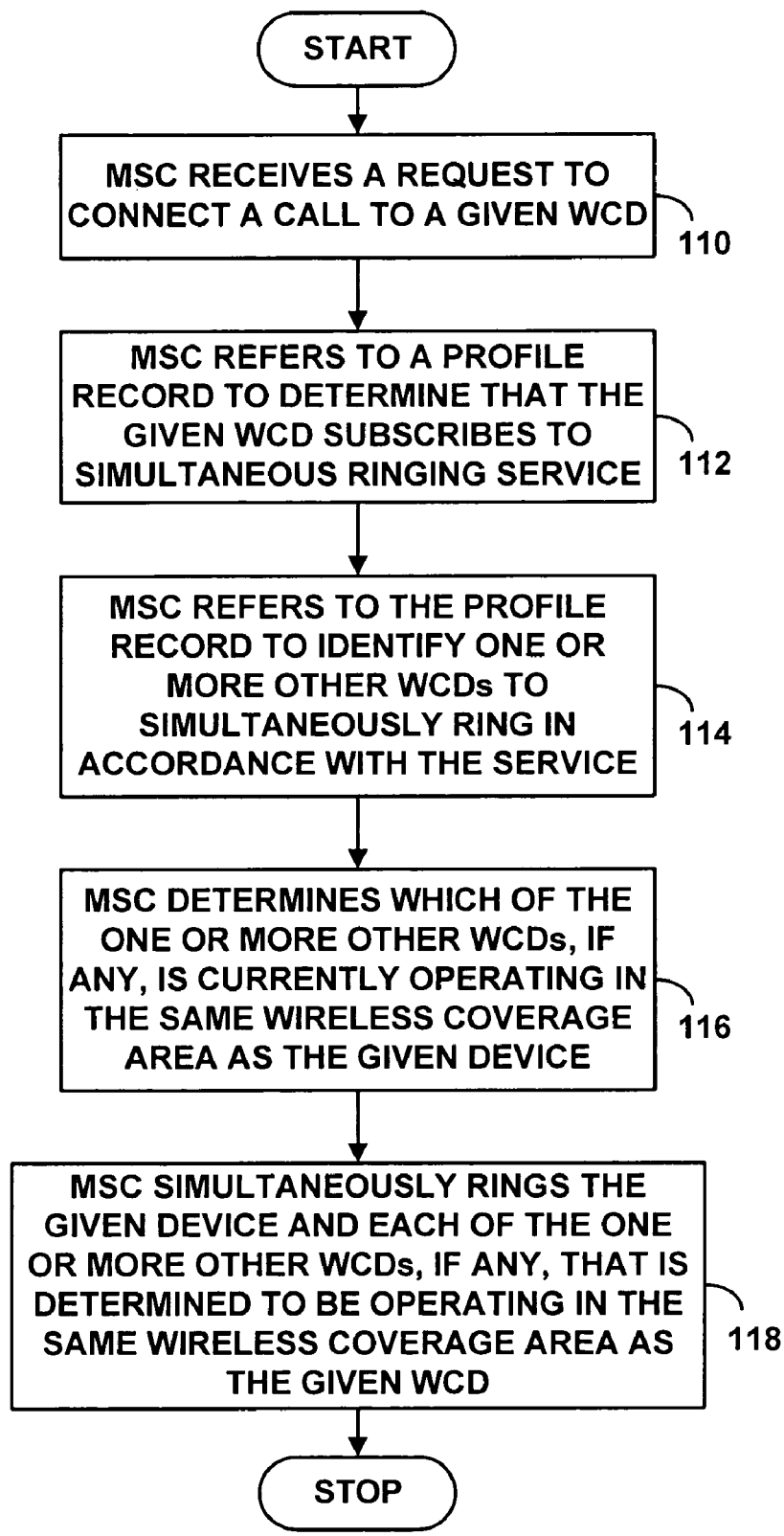
FIG. 7 is a flow chart to illustrate a set of functions that could be carried out in accordance with the exemplary embodiment.

FIG. 7 is a flow chart provided to help illustrate in more detail a set of functions that could be could be carried out in accordance with the exemplary embodiment, in the arrangement in FIG. 5 for instance.

At step 110, MSC 84 receives a request to connect a call to a given WCD, such as portable cell phone 74. MSC 84 could be programmed with an appropriate set of service logic (e.g., the MSC could include a database with program instructions stored thereon) that would cause the MSC to query subscriber profile 94 stored in VLR 86 and/or HLR 92. Subscriber profile 94 may include simultaneous ringing profile record 96 indicating that portable cell phone 74 subscribes to a simultaneous ringing service. For example, at step 112, MSC 84 may refer to profile record 96 stored in VLR 86 to determine that portable cell phone 74 subscribes to the simultaneous ringing service.

If the simultaneous ringing service can be turned on or off by a user selection, MSC 84 may first verify that the service is currently turned on. If the service is turned on, at step 114, the MSC could then identify one or more other WCDs that are listed in the profile record to simultaneously ring in accordance with the service. By way of example, the simultaneous ringing profile record for portable cell phone 74 could list WLL hub 72 as well as a number of other WCDs to simultaneously ring.

At step 116, MSC 84 may be further programmed to determine which of the one or more WCDs identified at step 112, if any, are currently operating in the same wireless coverage area as the given device. More particularly, in the present example, MSC 84 would determine which of the WCDs listed in simultaneous ringing profile record 96, i.e., WLL hub 72 and the number of other WCDs, are currently operating in cell coverage area 76 (in which portable cell phone 74 is currently operating) that could be specified as the given wireless coverage area in the simultaneous ringing profile record.

Generally, the determination of which of the other WCDs, if any, are currently operating in the same wireless coverage area as the given WCD would involve first determining which wireless coverage area the given WCD is currently operating in. The MSC could then determine what wireless coverage area each of the one or more other WCDs listed in the given WCD's profile is currently operating in and determine which of those wireless coverage areas match that of the given WCD. In general, the MSC may determine current location of the given device and each of the one or more other WCDs by various means.

As described above, location parameters of WCDs operating in the MSC serving area are normally collected from the WCDs through a registration process, and stored in a VLR and/or HLR for reference. Generally, the MSC does need not to update the HLR database with current location of the WCD every time the WCD registers while it is operating in the same MSC/VLR serving area. Thus, the HLR database typically provides location parameters of the WCD in the form an MSC_ID and VLR point code combination, which provides the MSC with an indication of the current serving system of the WCD, such as a particular MSC serving area.

For determination of a more granular location of the WCD within the MSC serving area (e.g., a particular cell and/or sector within the MSC serving area, in which the WCD is currently operating), the MSC may refer to a VLR database and/or other suitable data storage. For example, every time the WCD registers while operating in the same MSC serving area, the MSC can store the registered location data (e.g., Cell ID and Sector Number within the cell identified by the Cell ID and/or LAC) in the VLR database for quick reference. The MSC can then refer to that data upon receipt of a request to connect the call to the WCD, for instance, in order to direct a page to the WCD.

In general, a WCD can register with a wireless network under various scenarios. Section 2.6.5.1 of the industry standard IS-2000 (published in March 2000 as TIA/EIA/IS-2000-A), the entirety of which is hereby incorporated by reference, specifies a number of methods that cause a WCD to register within CDMA networks.

For example, the WCD may register in response to a Registration Request Order message sent over the paging channel from its serving base station (e.g., from a BSC via a BTS serving the cell site in which the device is currently located). This is known as an ordered registration, in which the base station commands all or some of the WCDs served by the base station to register. For example, the ordered registration can be directed to a specific WCD, a group of WCDs, or all of the WCDs currently operating within a given wireless coverage area. The BSC can then provide current location parameters to an MSC for reference.

The WCD may also perform various types of autonomous registration without an explicit command from the base station. These include, for instance, power-up, power-down, timer-based, zone-based, and distance-based registrations. For example, zone-based registration causes a mobile WCD to register whenever it moves into a new zone that is not on its internally stored list of visited registration zone(s). Zones may be associated with one or more cells or with sectors of a given cell. In one example, a mobile WCD could be required to send a registration message to its serving base station every time it transitions into a different sector, or zone, within a cell, and the base station could then relay the WCD's location parameters to an MSC.

The MSC can also infer the current network location of the WCD whenever the WCD attempts to initiate a call or responds to a page message transmitted from the network. More particularly, IS-634 messages, such as a Location Update Request message, Page Response message and a CM Service Request that the BSC sends to the MSC over the A-interface when the WCD registers, responds to a page and initiates a call, typically include Cell ID/Sector Number and/or LAC parameter of the wireless coverage area, in which the WCD is currently operating.

In CDMA networks, the MSC is also typically informed as to the current location of mobile WCDs during call handoffs. In particular, if the handoff results in a WCD being handed off to a different cell, the BSC serving the WCD will notify the MSC of the WCD's new network location. Additionally, if the MSC coordinates an inter-BSC handoff of the WCD, the MSC will have a knowledge of the wireless coverage area (e.g., a particular cell and sector), in which the WCD is currently operating.

Of course, for the purpose of a simultaneous ringing service, the MSC can also employ other methods of determining wireless coverage area in which a WCD is currently operating. For example, the MSC may query a BSC to request given location parameters (e.g., a given cell sector) if, for instance, the MSC requires more granular location of the WCD. The BSC, in turn, may provide the MSC with the requested location parameters.

Thus, as described, various means by which the MSC may have a knowledge of the WCD current location are possible in order to facilitate determination which of the other WCDs, if any, are currently operating in the same wireless coverage area as the given WCD.

By way of example, MSC 84 could refer to subscriber profile 94 stored in VLR 86 to retrieve current registered location of portable cell phone 74. As a result, MSC 84 could, for instance, determine the Cell ID associated with cell coverage area 76. MSC 84 could in the same way then look up the location parameters for WLL hub 72 and each of the number of other WCDs listed in the simultaneous ringing profile record in order to determine if the wireless coverage areas listed for those devices match with cell coverage area 76. By way of example, MSC 84 could determine, for instance, that both portable cell phone 74 and WLL hub 72 are currently operating in the same cell coverage area 76, while each of the number of other WCDs is currently operating in a wireless coverage area different from cell coverage area 76.

At step 118, the MSC then simultaneously rings the given device and each of the one or more other WCDs, if any, that is determined to be operating in the same wireless coverage area as the given WCD. As such, in the arrangement of FIG. 5, MSC 84 would responsively page both portable cell phone 74 and WLL hub 72 by simultaneously sending paging requests for both devices to BSC 82, which in turn would transmit respective page messages to both portable cell phone 74 and WLL hub 72 via BTS 80.

Preferably, the MSC will not simulataneously ring any of the one or more other WCDs that is not currently operating in the same wireless coverage area as the given WCD. Thus, in the above example, MSC 84 would not ring any of the number of other WCDs listed in the simultaneous ringing profile of portable cell phone 74.

Further note, that if the MSC determines that none of the one or more other WCDs is currently operating in the same wireless coverage area as the given device, the MSC would then only ring the given device as is typical.

4. Exemplary Alternatives

An exemplary embodiment of the present invention has been described above. Those skilled in the art will understand, however, that changes and modifications may be made to this embodiment without departing from the true scope and spirit of the present invention, which is defined by the claims.

By way of example, although the above description has focused on a switch, such as an MSC, carrying out the functions associated with the exemplary simultaneous ringing service, the functions can be also carried out at another entity, such as a BSC or an HLR.

For instance, in the latter case, the switch could be programmed with a relatively minimal set of service logic that would cause the switch to query the HLR in response to a request to connect a call to a given WCD. When the HLR receives the query message from the switch, it could execute an appropriate set of service logic and/or consult appropriate databases in order to obtain information and instructions needed to provide the simultaneous ringing service to the call. The HLR could then return a response message to the switch, instructing the switch how to handle the call.

In one embodiment, the HLR could be programmed to (i) determine that the given WCD subscribes to the simultaneous ringing service and (ii) identify one or more other WCDs to simultaneously ring in accordance with the service. To carry out those functions, the HLR could, for example, refer to its own database, or other database, in order to reference the simultaneous ringing profile record associated with the given WCD. The HLR could then send a signaling message to the switch, instruction the switch to (i) determine which of the one or more other WCDs, if any, are currently operating in the same wireless coverage area as the given WCD and (ii) simultaneously ring the given WCD and each of the one or more other WCDs, if any, that is determined to be operating in the same wireless coverage area as the given WCD.

As another example, while the foregoing description has focused on providing the simulations ringing service within a wireless coverage area controlled by a single switch, the wireless coverage area could be controlled by multiple switches that, as discussed above, can signal to each other to obtain subscriber's current location within a given serving system.

We claim:

1. A method of responding to a request to connect a call to a given wireless communication device (WCD) that is operating in a wireless coverage area, the method comprising:

determining that the given WCD subscribes to a simultaneous ringing service and identifying one or more other WCDs to simultaneously ring in accordance with the service;

making a determination of which of the one or more other WCDs are currently operating in the same wireless coverage area as the given WCD, wherein the wireless coverage area is a given cellular coverage area selected from the group consisting of (i) one or more given cell sectors in a cellular communication system and (ii) one or more given cells in a cellular communication system; and simultaneously ringing the given WCD and each of the one or more other WCDs that is, according to the determination, currently operating in the same wireless coverage area as the given WCD.

2. The method of claim 1, further comprising carrying out the method in a mobile switching center.

3. The method of claim 1, wherein the given WCD comprises a cellular telephone and each of the one or more other WCDs also comprises a cellular telephone.

4. The method of claim 1, wherein the given WCD comprises a mobile WCD, and at least one of the one or more other WCDs comprises a fixed WCD.

5. The method of claim 1, wherein determining that the given WCD subscribes to a simultaneous ringing service comprises referring to a profile record for the given WCD.

6. The method of claim 5, wherein identifying one or more other WCDs to simultaneously ring in accordance with the service comprises identifying the one or more other WCDs by reference to the profile record.

7. The method of claim 6, further comprising:
maintaining in the profile record, for the given WCD, a list of the one or more other WCDs to simultaneously ring in accordance with the service.

8. The method of claim 1, wherein determining which of the one or more other WCDs are currently operating in the same wireless coverage area as the given WCD comprises:
determining which wireless coverage area the given WCD is currently operating in; and
for each of the one or more other WCDs, determining whether the WCD is operating in the same wireless coverage area as the given WCD.

9. The method of claim 1, wherein the given cellular coverage area is a Base Station Controller (BSC) serving area in a cellular communication system.

10. The method of claim 1, wherein the given cellular coverage area is a Mobile Switching Center (MSC) serving area in a cellular communication system.

11. The method of claim 1, wherein simultaneously ringing the given WCD and each of the one or more other WCDs, if any, that is determined to be operating in the same wireless coverage area as the given WCD comprises:
sending a page message for the call to both the given WCD and sending a page message for the call respectively to each of the one or more other WCDs determined to be operating in the same wireless coverage area as the given WCD.

12. A simultaneous ringing system for use in a wireless communication network, the system comprising:
a stored profile record for a given wireless communication device (WCD) that is currently operating in a given wireless coverage area, the stored profile record indicating that the given WCD subscribes to a simultaneous ringing service and indicating one or more other WCDs to simultaneously ring in accordance with the service; and
service logic executable, in response to receipt of a request to connect a call to the given WCD, (i) to refer to the profile record so as to identify the one or more other WCDs, (ii) to determine which of the one or more other WCDs are currently operating in the same wireless coverage area as the given WCD, the wireless coverage area being a given cellular coverage area selected from the group consisting of (i) one or more given cell sectors in a cellular communication system and (ii) one or more given cells in a cellular communication system, and (iii) to simultaneously ring the given WCD and each of the one or more WCDs that is determined to be currently operating in the same wireless coverage area as the given WCD.

13. The simultaneous ringing system of claim 12, wherein the stored profile record resides in a visitor location register.

14. The simultaneous ringing system of claim 12, wherein the given WCD comprises a cellular telephone and each of the one or more other WCDs also comprises a cellular telephone.

15. The simultaneous ringing system of claim 12, wherein the given WCD comprises a mobile WCD, and at least one of the one or more other WCDs comprises a fixed WCD.

16. The simultaneous ringing system of claim 12, wherein the given cellular coverage area is a Base Station Controller (BSC) serving area in a cellular communication system.

17. The simultaneous ringing system of claim 12, wherein the given cellular coverage area is a Mobile Switching Center (MSC) serving area in a cellular communication system.

* * * * *